July 20, 1954 R. W. STARREVELD ET AL 2,684,200

DEVICE FOR DETERMINING CHECK SYMBOLS FOR SYMBOL GROUPS

Filed May 4, 1951

3 Sheets-Sheet 2

July 20, 1954 R. W. STARREVELD ET AL 2,684,200

DEVICE FOR DETERMINING CHECK SYMBOLS FOR SYMBOL GROUPS

Filed May 4, 1951 3 Sheets-Sheet 3

INVENTORS
REMMER W. STARREVELD
CORNELIUS ADRIANUS MEIJER
BY Robert E. Burns
ATTORNEY Patented July 20, 1954 2,684,200

UNITED STATES PATENT OFFICE 2,684,200

DEVICE FOR DETERMINING CHECK SYMBOLS FOR SYMBOL GROUPS

Remmer W. Starreveld, Amsterdam, and Cornelis Adrianus Meijer, Bloemendaal, Netherlands, assignors to Theodorus Reumerman, Zandvoort, Netherlands, and Willem Hendrik Theodorus Helmig, Leiden, Netherlands Application May 4, 1951, Serial No. 224,566

Claims priority, application France February 13, 1951

24 Claims. (Cl. 235—61)

The invention relates to a device for facilitating the detection of errors in arbitrary symbol groups composed out of a given series of $n$ symbols, comprising a selector by means of which the symbols of a symbol group may be selected, and an indicator displaying an appropriate check symbol after selection of a symbol group, said check symbol giving a univocal indication of the remainder $R_N(G)$ obtained on dividing a number G by a whole number N, the symbols of the given series being numbered in a predetermined manner, the said number G being equal to the algebraic sum of the numbers of the symbols of the group, each multiplied by a whole factor $k_i$, the said factors $k_i$ being dependent on the position of the symbol in the group and different for adjacent positions, and the said number N being greater than or equal to $n$ and having no divisors in common with the factors $k_i$ and with the differences between the factors $k_i$ for adjacent positions.

For instance, the symbols of the given series may be the digits, and they may be numbered according to their numerical value. The number N may be equal to 13, and the factor $k_i$ for the $i$-th position from the right of the symbol group may be: $k_1=1$, $k_2=10$, $k_3=9$, $k_4=12$, $k_5=3$, $k_6=4$, $k_7=1$, and so on. In this case, the number G for the symbol group 3683507 will be $$7+0+45+36+24+24+3=139$$

and the remainder $R_N(G)$ will be equal to 9. The remainders $R_N(G)$ may be indicated in a univocal manner by using as check symbols thirteen different letters of the alphabet, a remainder 0 being indicated by the letter A, a remainder 1 by the letter B, and so on. In this case, the remainder 9 will be indicated by the letter J, i. e. the letter J will be displayed by the indicator after selection of the symbol group 3683507.

The check symbol determined by means of a device of the above-mentioned kind may be added to the symbol group so as to accompany the same throughout its existence. Thus, any mutilation of the symbol group will be immediately detected when the check symbol is again determined, since the check symbol accompanying the symbol group will not correspond with the mutilated group.

It is the object of the present invention to provide for a device for facilitating the detection of errors in symbol groups as set forth hereinbefore, which is adapted to be operated by means of a key board and operates in a purely mechanical way, and which may be adapted to any desired values of the number N and the factors $k_i$.

According to the invention, the device comprises at least one toothed body for each position to be occupied by a symbol in a symbol group, provided with a plurality of teeth each having a different active length, and adapted to be placed in a plurality of positions in each of which a different number of teeth occupies a predetermined operative position and to be adjusted by the selection of a symbol in such manner that the number of operative teeth is equal to $R_N(\pm k_i a_i)$, $a_i$ being the number ascribed to the symbol, and further comprises a carriage provided with at least one rotatable shaft coupled with said indicator and carrying at least one toothed wheel, said carriage being adapted to be displaced after selection of a symbol group in such manner that the operative teeth of the said toothed bodies are successively engaged by the said toothed wheel or wheels, thereby displacing the indicator over $t$ steps, such that $R_N(t)=R_N(\Sigma k_i a_i)$.

The exact nature of our invention, and any additional objects thereof, will appear from the following description of some preferred embodiments, given with reference to the accompanying drawings, wherein Fig. 1 is a cross section of an embodiment of the invention, taken along the line I—I in Fig. 2;

Figure 1:
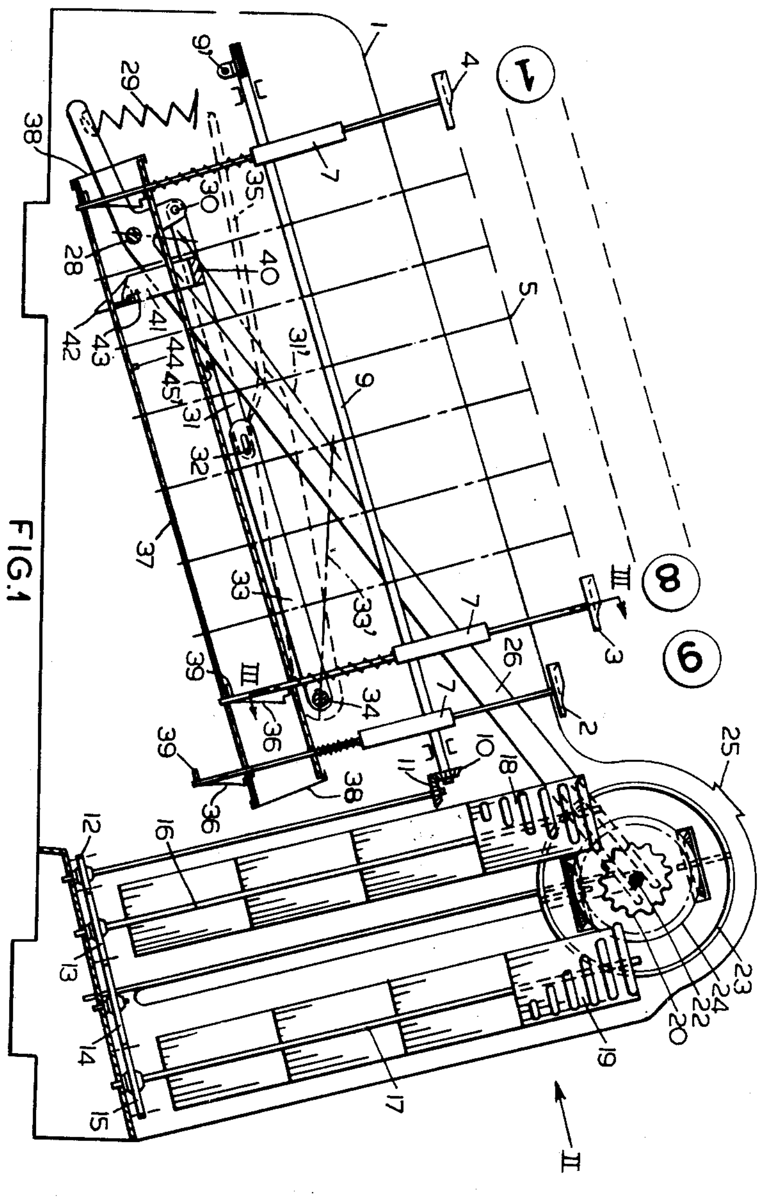
Figure 2:
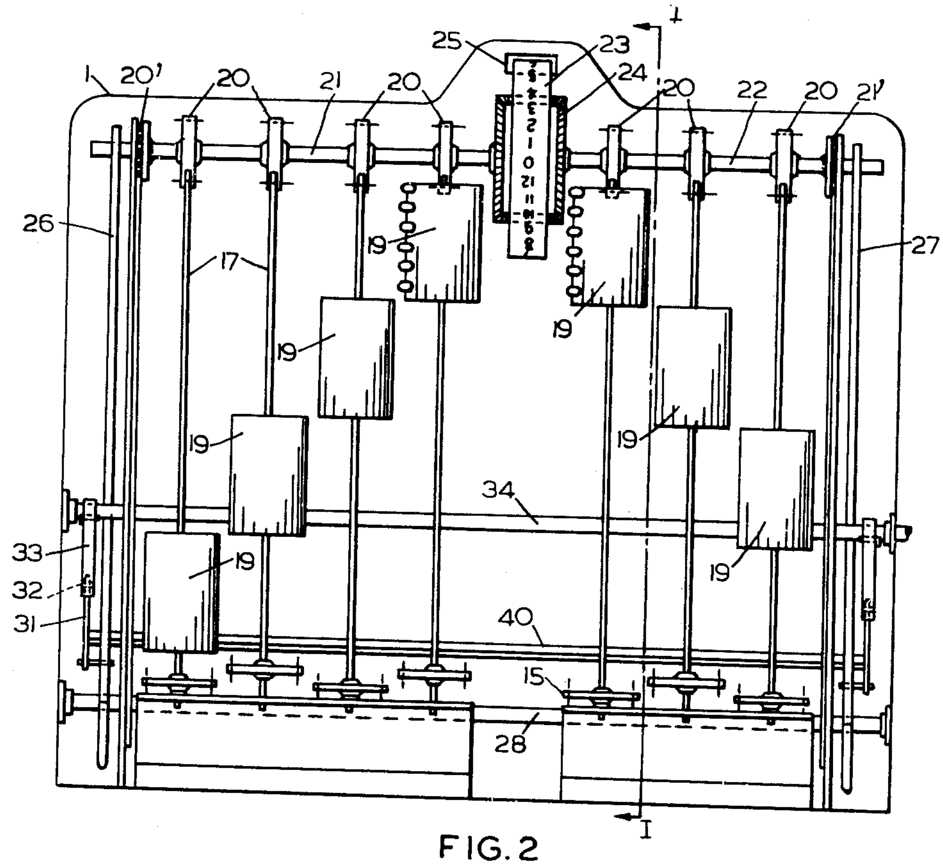
Fig. 2 shows the same device from behind, in the direction indicated by the arrow II in Fig. 1.
Figure 3:
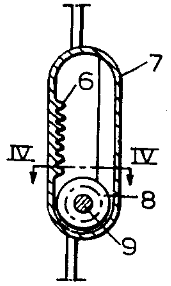
Fig. 3 is a vertical cross section of a key of the device shown in Figs. 1 and 2, drawn at a slightly enlarged scale.
Figure 4:
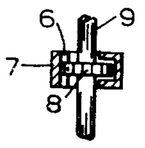
Fig. 4 is a horizontal cross section of the same key; taken along the line IV—IV in Fig. 3.
Figure 5:
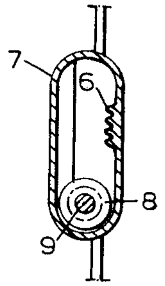
Fig. 5 is a vertical cross section of another key.

The device shown in Figs. 1 and 2 comprises a casing 1. As shown in Fig. 1, a plurality of keys extend through the top of the casing; there are as many rows of keys as positions to be occupied by a symbol in a symbol group. For instance, seven rows of nine keys may be provided. Only one row of keys is shown in Fig. 1, and only three of the keys are drawn in full, to wit a depressed key 2 and two non-depressed keys 3 and 4, the remaining six keys being schematically represented at 5. Inside the casing, each of the keys is provided with a toothed rack as illustrated by Figs. 3, 4 and 5. As shown in these latter figures, the toothed rack 6 is formed on the inside of a hollow body 7 enclosing a toothed wheel 8 mounted on a shaft 9. The toothed rack may be placed either at the left or at the right of the toothed wheel 8, so that the shaft 9 is rotated either in counterclockwise, or in clockwise direction upon depression of the key.

The shaft 9 is also shown in Fig. 1; it is common to all the keys of a row, and it is coupled by means of toothed wheels 10—15 with two shafts 16 and 17, each carrying a toothed body 18, or 19 respectively. Each of these bodies is formed as a cylinder provided with six teeth each having a different active length and placed at right angles to the axis of the cylinder. These teeth may be engaged by a toothed wheel 20 adapted to be moved past the bodies 18 and 19 in a manner to be described hereinafter. In the positions of the bodies 18 and 19 as shown in the drawing, toothed wheel 20 may pass the bodies 18 and 19 without engaging any teeth of the same. However, it will be clear upon inspection of the drawing that the teeth of body 18 will successively be brought into the path of toothed wheel 20 upon rotation of shaft 9 in one direction, and that the teeth of body 19 will successively be brought into the path of toothed wheel 20 when shaft 9 is rotated in opposite direction. The transmission between shaft 9 and shafts 16 and 17 has been chosen in such manner that the number of teeth of the bodies 18 and 19 which are made operative by bringing them into the path of toothed wheel 20 is equal to the number of teeth of the toothed rack 6 by means of which shaft 9 is displaced, and that the teeth of either body 18 or body 19 are made operative according as the toothed rack is placed on one side or on the other side of shaft 9. The toothed rack 6 of the key serving for selecting a symbol having the number $a_i$ in position $i$ of a symbol group has either $R_N(k_ia_i)$ teeth on one side of shaft 9, or $R_N(-k_ia_i)$ teeth on the other side of shaft 9. Thus upon being moved past the bodies 18 and 19, toothed wheel 20 will be displaced either over $R_N(k_ia_i)$ steps in one direction or over $R_N(-k_ia_i)$ steps in opposite direction. At its free end, shaft 9 is provided with axial teeth engaging a resilient detent member 9′, so that shaft 9 can only be placed in any of a plurality of fixed positions.

As shown in Fig. 2, a set of toothed bodies 18, 19 is provided for each position to be occupied by a symbol in a symbol group. Accordingly, seven bodies 19 are shown in Fig. 2, as well as seven toothed wheels 20. The toothed wheels 20 are partly mounted on a shaft 21 and partly on a shaft 22, these shafts being coupled with an indicator 23 by means of a differential gearing 24. By these means, toothed wheels mounted on shafts 21 and 22, respectively, may be rotated at the same time, so that two sets of bodies 18, 19 may be engaged by the appertaining toothed wheels 20 simultaneously. Thus the path to be covered by the toothed wheels 20 in order to engage all the bodies 18, 19 is considerably shortened. Ratchet means 20′, 21′ are provided at the free ends of shafts 21 and 22, so that the same can only be placed in any of a plurality of fixed positions.

The assembly formed by shafts 21 and 22, differential gearing 24 and indicator 23 constitutes a carriage which may be moved past the toothed bodies 18, 19 after selection of a symbol group. It will be clear that the selection of the symbols in a symbol group brings the bodies 18, 19 into appropriate positions in which a number of teeth corresponding with $R_N(k_ia_i)$, as explained hereinbefore, is made operative. Normally, the carriage occupies its lowermost position. After selection of a symbol group, it is moved to its top position as indicated in the drawing, so that the toothed bodies 18, 19 are successively engaged by the appertaining toothed wheels 20, and the indicator 23 is displaced over a number of steps $t$, such that $R_N(t)=R_N(\Sigma k_ia_i)$. Hence, the check symbol corresponding with the selected symbol group will be displayed by indicator 23 at the end of its movement. This check symbol may be read through a window 25 provided in the casing 1.

After the check symbol has been read, the carriage is returned to its zero position. During its return movement, the bodies 18, 19 are again engaged by the appertaining toothed wheels 20, whereby the indicator is likewise returned to its zero position. After that, the depressed keys are released, so that the toothed bodies 18, 19 resume their zero positions.

The manner in which the carriage may be displaced will now be described. Shafts 21 and 22 are supported by the forked ends of two levers 26, 27 rotatable about a shaft 28, and balanced at their free ends by means of springs 29. Each of these levers is provided with a projection shown at 30 in Fig. 1, to which an arm 31 is pivotally attached. At its free end, each of the arms 31 is provided with a pin 32 engaging an oblong hole provided in a lever 33. The levers 33 are fixedly attached to a shaft 34 which may be rotated by means of an operating member 35.

Normally, the arms 31 and the levers 33 occupy the positions shown at 31′ and 33′ in Fig. 1. Upon actuation of the operating member 35, the levers 33 are lowered, and the arms 31 are pushed to the outside, so that the levers 26, 27 are rotated so as to lift the carriage from its lowermost position to its top position. In the final position of levers 33 and arms 31, the levers 33 are in exact alignment with arms 31, so that the carriage is locked in its top position, and the operating member 35 may be released, if desired, in order to write down the check symbol displayed by the indicator. By slightly actuating the operating member 35, the carriage is released and lowered to its zero position.

Each of the keys is provided at its bottom end with a bit 36 adapted to engage a locking strip 37 in order to lock a depressed key. The locking strip 37 is suspended by means of spring blades 38, which return the strip to its normal position as soon as it is released. A heel 39 provided on the bit 36 prevents a depression of a second key in any row.

In order to release the depressed keys after the carriage has been returned to its zero position, the arms 31 are interconnected by a beam 40, carrying a plurality of projections 41 each in the vicinity of one of the locking strips. Of course, there is a locking strip for each row of keys, so that seven projections 41 are provided. Each of these projections is provided with a resiliently attached detent member 42, normally kept in the position as shown by a spring 43. A projection 44 is provided on each locking strip so as to be engaged by the detent member 42.

As the carriage is lifted to its top position, the detent member 42 engages the projection 44, but in doing so, it is displaced to the right and it passes over the projection without moving the locking strip. During the return movement of the carriage, however, the detent member moves the locking strip to the right so as to release the depressed keys.

In order that the keys are released after the carriage reaches its zero position, a spring 45' is provided which tends to move the arm 31 upwards. Hence, the pin 32 is kept at the right end of the hole in the lever 33 during its return movement. As soon as levers 33 and arms 31 have resumed their top position, the pin 32 passes over to the left end of the hole, and in this moment the detent member 42 engages the projection 44 so as to release the keys.

As shown in Fig. 2, the indicator bears twice the numbers from 0 to 12 for indicating the remainder $R_N(G)$. Instead of these numbers, letters may be used, for instance the letters from A to M.

The check symbols arranged on the indicator 23 may be formed as printing types adapted to be pressed against a printing roller in the final positions of the carriage, so that the check symbol is printed together with the symbol group. Of course, the symbols of the symbol group proper may be printed in this case by types actuated by the keys in the manner of a typewriter.

The number of teeth to be provided in each of the toothed racks of the keys is indicated by way of example in the following table. This table is based on the assumption that the given symbol series consists of the digits, numbered according to their numerical values, and that the number N is equal to 13, whilst the following factors $k_i$ are used: $k_1=1$, $k_2=10$, $k_3=9$, $k_4=12$, $k_5=3$, $k_6=4$, $k_7=1$. A plus sign indicates teeth on one side of shaft 9, and a minus sign teeth on the other side of shaft 9. The positions in the symbol group are numbered from right to left.

| Positions | 1 | 2 | 3 | 4 | 5 | 6 | 7 |
|---|---|---|---|---|---|---|---|
| Key Nos: | | | | | | | |
| 1 | +1 | −3 | −4 | −1 | +3 | +4 | +1 |
| 2 | +2 | −6 | +5 | −2 | +6 | −5 | +2 |
| 3 | +3 | +4 | +1 | −3 | −4 | −1 | +3 |
| 4 | +4 | +1 | −3 | −4 | −1 | +3 | +4 |
| 5 | +5 | −2 | +6 | −5 | +2 | −6 | +5 |
| 6 | +6 | −5 | +2 | −6 | +5 | −2 | +6 |
| 7 | −6 | +5 | −2 | +6 | −5 | +2 | −6 |
| 8 | −5 | +2 | −6 | +5 | −2 | +6 | −5 |
| 9 | −4 | −1 | +3 | +4 | +1 | −3 | −4 |

The maximum number of teeth that will have to be made operative if two bodies are used is thus equal to 6, i. e. to ½ $(N-1)$.

Figure 6:
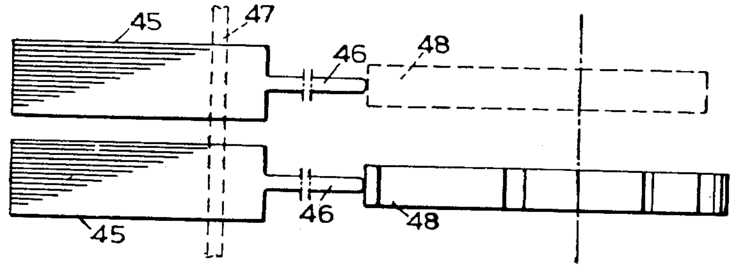
Fig. 6 is a schematic plan view of a modification of the device shown in Figs. 1–5.
Figure 7:
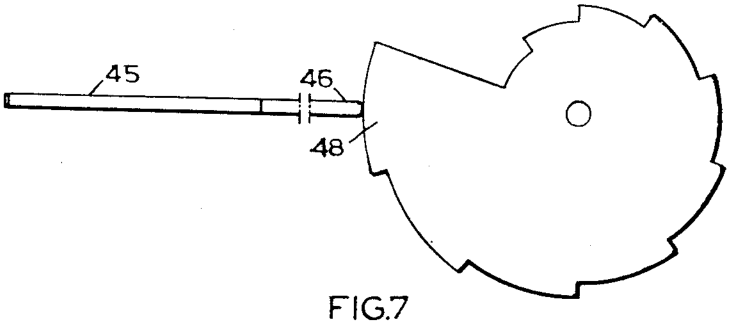
Fig. 7 is a schematic side view of the device shown in Fig. 6.
Figure 8:
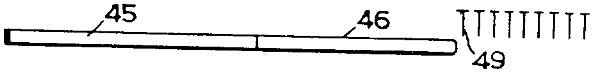
Fig. 8 is a schematic side view of another modification.

Figs. 6 and 7 show a modification of the device according to the invention in which a different kind of toothed bodies is used. In this embodiment, the toothed bodies are formed as strips 45, provided with teeth having each a different active length, and slidable in the direction of the teeth. Each of the strips is provided with a feeler 46 serving to determine the final position of the strip. It will be clear that the number of teeth brought into the active position indicated by the dotted lines 47 will vary according as the feelers are free to move over a greater or smaller distance. This distance is determined by a cam disc 48 adapted to be adjusted by the selection of a symbol. Normally, the strips 45 are kept in their zero position by a retaining member not shown in the drawing. After the symbols of a symbol group have been selected and the cam discs have been brought in the appropriate positions, the strips are released, and moved forward by spring action until the feelers abut against the cam discs. By providing the cam discs with a profile corresponding with the values indicated in the above table, the number of teeth on each strip which is brought into the operative position may be made equal to $R_N(k_ia_i)$. As soon as the strips have reached their final positions, a carriage is run over the path enclosed between the dotted lines 47, so that a toothed wheel mounted on this carriage and coupled with the indicator successively engages the operative teeth of all the strips. Thus, the indicator will be displaced over a number of steps corresponding with the check symbol of the selected symbol group as explained with reference to Figs. 1–5.

The cam discs 48 may each be coupled with one of a plurality of figure wheels adapted to be adjusted by either a full or a singular key board in known manner.

Fgi. 8 shows a modification which is particularly suitable to be actuated by means of a full key board. As shown in the drawing, each of the keys is provided with an extension 49 which is brought into the path of a feeler 46 upon depression of the key. Thus, after being released, the strips 45 move over a greater or smaller distance according to the number of the symbol selected by means of the depressed key. The teeth of the strips 45 are arranged in a pattern substantially corresponding with the above table, so that a suitable number of teeth is brought into the operative position upon selection of a symbol. For the rest, the operation is similar to that of the devices already described.

Although the invention has been explained hereinbefore with reference to some specific embodiments, it will be understood that many modifications of these embodiments are possible within the scope of the invention.

In the appended claims, the term "group" or "symbol group" designates a group consisting of any desired number of symbols selected from a given series of $n$ symbols, and the symbols in said series are assumed to be numbered in a predetermined order. The term "check symbol of a symbol group" designates a symbol giving a univocal indication of the remainder $R_N(G)$ obtained on dividing a number G by a whole number N, G being equal to the algebraic sum of the numbers of the symbols of the group each multiplied by a whole factor $k_i$ dependent on the position of the symbol in the group and different for adjacent positions, and N being equal to or greater than $n$ and having no divisors in common with any of the factors $k_i$, nor with any of the differences between the factors $k_i$ for adjacent positions.

We claim:

1. A device for determining the check symbol of a symbol group, comprising a selector for inserting the symbols of a group, an indicator displaying the check symbol, at least one toothed body for each position to be occupied by a symbol in a group, provided with a plurality of teeth each having a different active length and actuated by said selector in such manner that the selection of a symbol having the number $a_i$ in position $i$ of a group causes a number of teeth equal to $R_N(k_ia_i)$ to be placed in a predetermined operative position, at least one rotatable shaft coupled with said indicator, gear means on said shaft, a carriage carrying said shaft and said indicator, and means for displacing said carriage after selection of a group in such manner that said gear means successively engage the teeth of the said toothed bodies that are placed in said operative position so as to displace said indicator over $t$ steps, so that $R_N(t)=R_N(\Sigma k_i a_i)$.

2. A device as claimed in claim 1, wherein each of the said toothed bodies is formed as a cylinder provided at its circumference with teeth perpendicular to its axis.

3. A device for determing the check symbol of a symbol group, comprising a selector for inserting the symbols of a group, an indicator displaying the check symbol, at least one toothed body for each position to be occupied by a symbol in a group, provided with a plurality of teeth each having a different active length and actuated by said selector in such manner that the selection of a symbol having the number $a_i$ in position $i$ of a group causes a number of teeth equal to $R_N(k_i a_i)$ to be placed in a predetermined operative position, at least one rotatable shaft coupled with said indicator, a plurality of toothed wheels on said shaft, each associated with one of the said toothed bodies, a carriage carrying said shaft and said indicator, and means for displacing said carriage after selection of a group in such manner that the said toothed wheels successively engage the teeth of the associated toothed bodies that are placed in said operative position so as to displace said indicator over $t$ steps, so that $R_N(t)=R_N(\Sigma k_i a_i)$.

4. A device as claimed in claim 3, wherein said carriage comprises two shafts each carrying a part of the said toothed wheels, and a differential gearing coupling the said shafts with said indicator.

5. A device for determining the check symbol of a symbol group, comprising a selector for inserting the symbols of a group, an indicator displaying the check symbol, a set of two toothed bodies for each position to be occupied by a symbol in a group, each of the said bodies being provided with $\frac{1}{2}(N-1)$ teeth each having a different active length and the bodies of each set being coupled with said selector in such manner that the selection of a symbol having the number $a_i$ in position $i$ of a group causes either a number of teeth equal to $R_N(k_i a_i)$ of one body or a number of teeth equal to $R_N(-k_i a_i)$ of the other body to be placed in a predetermined operative position, at least one rotatable shaft coupled with said indicator, gear means on said shaft, a carriage carrying said shaft and said indicator, and means for displacing said carriage after selection of a group in such manner that said gear means is passed between the toothed bodies of each set and successively engages the teeth of the said toothed bodies that are placed in said operative position so as to displace said indicator over $t$ steps, so that $R_N(t)=R_N(\Sigma k_i a_i)$.

6. A device as claimed in claim 5, wherein each of the said toothed bodies is formed as a cylinder provided at its circumference with teeth perpendicular to its axis.

7. A device for determining the check symbol of a symbol group, comprising a selector for inserting the symbols of a group, an indicator displaying the check symbol, a set of two toothed bodies for each position to be occupied by a symbol in a group, each of the said bodies being provided with $\frac{1}{2}(N-1)$ teeth each having a different active length and the bodies of each set being coupled with said selector in such manner that the selection of a symbol having the number $a_i$ in position $i$ of a group causes either a number of teeth equal to $R_N(k_i a_i)$ of one body or a number of teeth equal to $R_N(-k_i a_i)$ of the other body to be placed in a predetermined operative position, at least one rotatable shaft coupled with said indicator, a plurality of toothed wheels on said shaft each associated with one of the said sets of toothed bodies, a carriage carrying said shaft and said indicator, and means for displacing said carriage after selection of a group in such manner that each of the said toothed wheels is passed between the toothed bodies of the associated set, and that the said toothed wheels successively engage the teeth of the said toothed bodies that are placed in said operative position so as to displace said indicator over $t$ steps, so that $R_N(t)=R_N(\Sigma k_i a_i)$.

8. A device as claimed in claim 7, wherein the said carriage comprises two shafts each carrying a part of the said toothed wheels, and a differential gearing coupling the said shafts with said indicator.

9. A device for determining the check symbol of a symbol group, comprising a key board containing a separate key group for each position to be occupied by a symbol in a symbol group, a plurality of toothed racks each attached to one of the keys of said key board, a plurality of shafts each associated with one of the said key groups, a plurality of toothed wheels on each of the said shafts, each engaging one of the toothed racks of the keys of the associated key group, at least one toothed body for each of the said key groups, coupled with the associated shaft so as to be displaced upon depression of a key over a number of steps equal to the number of teeth on the toothed rack of said key, and provided with a plurality of teeth each having a different active length, so that the selection of a symbol having the number $a_i$ in position $i$ of a symbol group causes a number of teeth equal to $R_N(k_i a_i)$ on said toothed body to be placed in a predetermined operative position, an indicator displaying the check symbol, at least one shaft coupled with said indicator, gear means on said last-mentioned shaft, a carriage carrying said last-mentioned shaft and said indicator, and means for displacing said carriage after selection of a symbol group in such manner that said gear means successively engages the teeth of the said toothed bodies that are placed in said operative position so as to displace said indicator over $t$ steps, so that $R_N(t)=R_N(\Sigma k_i a_i)$.

10. A device as claimed in claim 9, further comprising a plurality of hollow bodies each attached to one of the keys of said key board and each enclosing the associated toothed wheel, the said toothed racks being formed each on the inside of the associated hollow body.

11. A device as claimed in claim 9, wherein each of the said first-mentioned shafts is provided with axial teeth at one of its ends, and further comprising a resilient detent member for each of the said shafts engaging the said axial teeth.

12. A device for determining the check symbol of a symbol group, comprising a key board containing a separate key group for each position to be occupied by a symbol in a symbol group, a plurality of toothed racks each attached to one of the keys of said key board, a plurality of shafts each associated with one of the said key groups, a plurality of toothed wheels on each of the said shafts, each engaging one of the toothed racks of the keys of the associated key group, the maximum number of teeth on any of the said toothed racks being equal to $\frac{1}{2}(N-1)$, and some of the said toothed racks being placed on one side and the remaining toothed racks on the other side of the associated toothed wheel, a set of two toothed bodies for each of the said key groups, coupled with the associated shaft so as to be displaced upon depression of a key over a number of steps equal to the number of teeth on the toothed rack of said key, each of the said toothed bodies being provided with a plurality of teeth each having a different active length, so that the selection of a symbol having the number $a_i$ in position $i$ of a symbol group causes either a number of teeth equal to $R_N(k_ia_i)$ of one body of the associated set or a number of teeth equal to $R_N(-k_ia_i)$ of the other body of said set to be placed in a predetermined operative position according as the toothed rack actuated by said selection is placed on one side or on the other side of the associated toothed wheel, an indicator displaying the check symbol, at least one shaft coupled with said indicator, gear means on said last-mentioned shaft, a carriage carrying said last-mentioned shaft and said indicator, and means for displacing said carriage after selection of a symbol group in such manner that the said gear means is passed between the toothed bodies of each set, and that the said gear means successively engages the teeth of the said toothed bodies that are placed in said operative position so as to displace said indicator over $t$ steps, so that $R_N(t)=R_N(\Sigma k_ia_i)$.

13. A device as claimed in claim 12, further comprising a plurality of hollow bodies each attached to one of the keys of said key board and each enclosing the associated toothed wheel, the said toothed racks being formed each on the inside of the associated hollow body.

14. A device as claimed in claim 12, wherein each of the said first-mentioned shafts is provided with axial teeth at one of its ends, and further comprising a resilient detent member for each of the said shafts engaging the said axial teeth.

15. A device for determining the check symbol of a symbol group, comprising a selector for inserting the symbols of a group, an indicator displaying the check symbol, at least one toothed body for each position to be occupied by a symbol in a group, actuated by said selector and provided with a plurality of teeth each having a different active length, so that the selection of a symbol having the number $a_i$ in position $i$ of a group causes a number of teeth equal to $R_N(k_ia_i)$ to be placed in a predetermined operative position, a shaft coupled with said indicator, gear means on said shaft, a carriage carrying said shaft and said indicator, means for displacing said carriage after selection of a group in such manner that the said gear means successively engages the teeth of the said toothed bodies that are placed in said operative position so as to displace said indicator over $t$ steps, so that $$R_N(t)=R_N(\Sigma k_ia_i)$$

and means for returning said carriage to its zero position in such manner that said gear means again engages the said teeth of the toothed bodies so as to return said indicator to its zero position.

16. A device as claimed in claim 15, wherein said selector is formed as a key board, further comprising means for locking a depressed key, and means operative after said carriage has been returned to its zero position for releasing the depressed keys.

17. A device for determining the check symbol of a symbol group, comprising a selector for inserting the symbols of a group, an indicator displaying the check symbol, a set of two toothed bodies for each position to be occupied by a symbol in a group, actuated by said selector and each provided with a plurality of teeth each having a different active length, so that the selection of a symbol having the number $a_i$ in position $i$ of a group causes either a number of teeth equal to $R_N(k_ia_i)$ of one body or a number of teeth equal to $R_N(-k_ia_i)$ of the other body of the set actuated by said selection to be placed in a predetermined operative position, a shaft coupled with said indicator, gear means on said shaft, a carriage carrying said shaft and said indicator, and means for displacing said carriage after selection of a group in such manner that said gear means is passed between the toothed bodies of each set, and that said gear means successively engages the teeth of the said toothed bodies that are placed in said operative position so as to displace said indicator over $t$ steps, so that $$R_N(t)=R_N(\Sigma k_ia_i)$$

and means for returning said carriage to its zero position in such manner that said gear means again engages the said teeth of the toothed bodies so as to return said indicator to its zero position.

18. A device as claimed in claim 17, wherein said selector is formed as a key board, further comprising means for locking a depressed key, and means operative after said carriage has been returned to its zero position for releasing the depressed keys.

19. A device for determining the check symbol of a symbol group, comprising a selector for inserting the symbols of a group, an indicator displaying the check symbol, at least one toothed body for each position to be occupied by a symbol in a group, actuated by said selector and provided with a plurality of teeth each having a different active length, so that the selection of a symbol having the number $a_i$ in position $i$ of a group causes a number of teeth equal to $R_N(k_ia_i)$ to be placed in a predetermined operative position, a shaft coupled with said indicator, at least one toothed wheel on said shaft, a carriage carrying said shaft and said indicator, means for displacing said carriage after selection of a group in such manner that said toothed wheel successively engages the teeth of said toothed body that are placed in said operative position so as to displace said indicator over $t$ steps, so that $R_N(t)=R_N(\Sigma k_ia_i)$, two levers having forked ends, supporting said carriage at the said ends, a spring for each of the said levers balancing the same at its free end, and an operating member for simultaneously displacing the said levers.

20. A device as claimed in claim 19, further comprising two arms each pivotally attached to a projection of one of the said levers, a second pair of levers directly coupled with said operating member, and a pin at the free end of each of the said first-mentioned levers, engaging an oblong hole in one of the last-mentioned levers.

21. A device as claimed in claim 20, wherein said selector is formed as a key board, further comprising a plurality of locking strips for locking the depressed keys, a beam interconnecting the said arms and having a plurality of projections each in the vicinity of one of the said locking strips, a plurality of stop members each resiliently attached to one of the projections of said beam, and each engaging a projection of the adjacent locking strip at the end of the return movement of the said arms.

22. A device for determining the check symbol of a symbol group, comprising a selector for inserting the symbols of a group, an indicator displaying the check symbol, a set of two toothed bodies for each position to be occupied by a symbol in a group, actuated by said selector and each provided with a plurality of teeth each having a different active length, so that the selection of a symbol having the number $a_i$ in position $i$ of a group causes either a number of teeth equal to $R_N(k_i a_i)$ of one body or a number of teeth equal to $R_N(-k_i a_i)$ of the other body of the set actuated by said selection to be placed in a predetermined operative position, a shaft coupled with said indicator, gear means on said shaft, a carriage carrying said shaft and said indicator, means for displacing said carriage after selection of a group in such manner that said gear means is passed between the toothed bodies of each set, and that said gear means successively engages the teeth of the said toothed bodies that are placed in said operative position so as to displace said indicator over $t$ steps, so that $$R_N(t) = R_N(\Sigma k_i a_i)$$

two levers having forked ends, supporting said carriage at the said ends, a spring for each of the said levers balancing the same at its free end, and an operating member for simultaneously displacing the said levers.

23. A device as claimed in claim 22, further comprising two arms each pivotally attached to a projection of one of the said levers, a second pair of levers directly coupled with said operating member, and a pin at the free end of each of the said first-mentioned levers, engaging an oblong hole in one of the said last-mentioned levers.

24. A device as claimed in claim 23, wherein said selector is formed as a key board, further comprising a plurality of locking strips for locking the depressed keys, a beam interconnecting the said arms and having a plurality of projections each in the vicinity of one of the said locking strips, a plurality of stop members each resiliently attached to one of the projections of said beam, and each engaging a projection of the adjacent locking strip at the end of the return movement of the said arms.

No references cited.